United States Patent [19]

Jung

[11] Patent Number: 5,101,507
[45] Date of Patent: Mar. 31, 1992

[54] RADIO-FREQUENCY POWER LEVEL CONTROL CIRCUIT OF MOBILE RADIO TELEPHONE

[75] Inventor: Jae-Ik Jung, Daegu-city, Rep. of Korea

[73] Assignee: SamSung Electronics Co., Ltd., Kyung Ki-Do, Rep. of Korea

[21] Appl. No.: 408,544

[22] Filed: Sep. 18, 1989

[30] Foreign Application Priority Data

Apr. 26, 1989 [KR] Rep. of Korea .................. 5517/1989

[51] Int. Cl.$^5$ .............................................. H04B 1/04
[52] U.S. Cl. ...................................... 455/127; 455/99
[58] Field of Search ................ 455/56, 127, 343, 116, 455/129, 99, 89; 303/243; 328/60, 61, 104; 341/139, 153

[56] References Cited

U.S. PATENT DOCUMENTS 3,914,696 10/1975 Evans ........................ 331/36 R
4,636,741 1/1987 Mitzlaff ....................... 455/89

Primary Examiner—Reinhard J. Eisenzopf
Assistant Examiner—Edward Urban
Attorney, Agent, or Firm—Robert E. Bushnell

[57] ABSTRACT

Disclosed is a circuit being capable of controlling RF-power levels without application of an additional controller to a booster module when trying to utilizing an hand-held radio telephone as a mobile radiophone for use in a vehicle. The circuit selects a correct level of RF-power output suitably corresponding to a desired mode of the mobile radiophone, in accordance with generating a plurality of bits of logic control signal. The circuit comprises a first voltage source of logic high level, second voltage source of logic low level, a switching circuit for selectively outputting the first or second voltage source through each bit of output port switched according to the first or second logic control signal, and apparatus for producing the radio-frequency power control voltage to control said radio-frequency power, by combination of resistors each having a given value according to the first and second voltage sources.

21 Claims, 2 Drawing Sheets

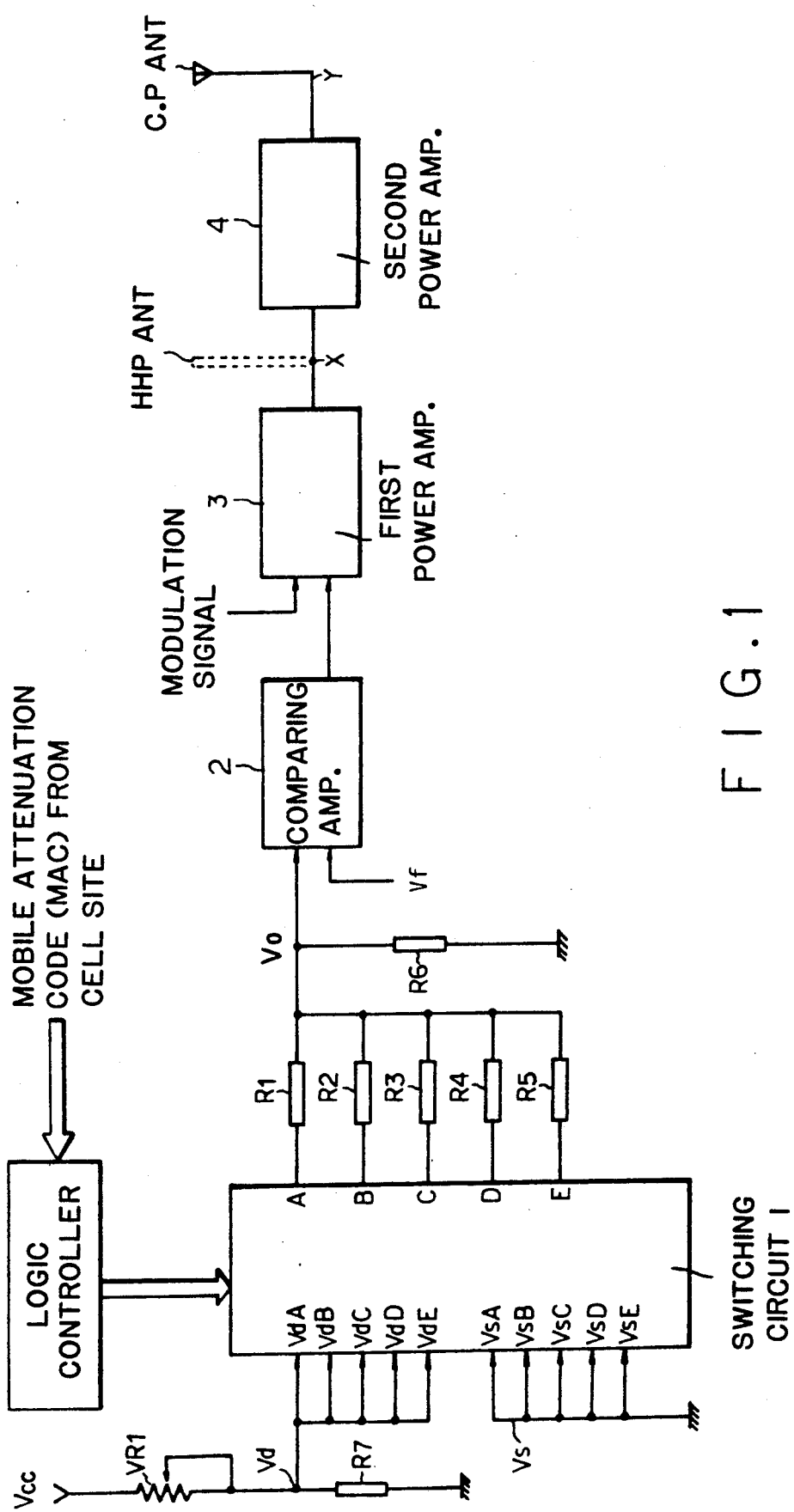
F I G. 1

RADIO-FREQUENCY POWER LEVEL CONTROL CIRCUIT OF MOBILE RADIO TELEPHONE

CROSS REFERENCE TO RELATED APPLICATIONS

This application makes reference to, and claims the benefits available under Title 35 U.S.C. §120 of a co-pending application entitled RADIO-FREQUENCY POWDER CONTROL CIRCUIT OF MOBILE RADIOPHONE filed in the U.S. Patent & Trademark Office on the 5th of September in the year 1989 and assigned Ser. No. 07/402,643.

BACKGROUND OF THE INVENTION

The present invention relates to a radio-frequency (RF) power level control circuit for use in a mobile radio telephone, and more particularly to a circuit capable of being applied to a vehicle radio telephone by controlling a booster module thereof, with utilizing an RF power control system of hand-held mobile radio telephone.

Generally, the mobile radio telephone includes a vehicle radiophone (hereinafter referred to as car phone) and a portable hand-held phone (hereinafter referred to as HHP). The mobile radio communication system for operating the car phone and HHP employs a so-called cellular radio communication method. The cellular radio communication method divides its entire service area into a plurality of sub-areas called cells and employs a different frequency for each of the cells, wherein so far as there is no frequency interference between the cells, the frequency band used in other cells may be employed again to increase the communication efficiency and capability and to improve the communication quality. The known cellular communication method may be represented by the AMPS (Advanced Mobile Phone Service) system developed by the Bell Laboratory or ARTS (American Radio Telephone Service) system developed by AT & T. A mobile radio communication system includes a mobile telephone switching office, cell sites, and mobile radiophones. The mobile telephone switching office communicates with the cell sites on wire, while the cell site communication with the mobile radiophone is wireless. The mobile telephone switching office interconnects the wire telephone line network with the mobile radio communication system, and controls the channels allotted for the cell sites. The cell site controls various signals dealing with the wire telephone network in cooperation with the mobile telephone switching office, monitors the signal intensity of mobile radiophones within its own cell area to provide the information of the signal intensity to the mobile telephone switching office, and transfers to mobile radiophones the information received from the mobile telephone switching office. Thus, telephone subscribers connected to the mobile telephone switching office can communicate with a selected mobile radiophone. Upon using this system, if RF-signal power of a certain mobile radiophone near the cell site is controlled to increase, the communication sensitivity to the other mobile radiophone distant from the cell site will decrease. Hence, the cell site monitors the signal sensitivity of the mobile radiophone within its cell in order to adjust the signal sensitivity. To achieve the improvement of communication sensitivity, the mobile radio telephone system prescribes the effective radiation power (ERP) according to the classification of the mobile radiophones, as shown in the following table 1.

TABLE 1

| Power Level MAC (PL) | EIA Specification (Power Output and Power Control) ERP(dBw) according to Power Class | | |
|---|---|---|---|
| | I | II | III |
| PL0 000 | 6 | 2 | −2 |
| PL1 001 | 2 | 2 | −2 |
| PL2 010 | −2 | −2 | −2 |
| PL3 011 | −6 | −6 | −6 |
| PL4 100 | −10 | −10 | −10 |
| PL5 101 | −14 | −14 | −14 |
| PL6 110 | −18 | −18 | −18 |
| PL7 111 | −22 | −22 | −22 |

Therefore, by monitoring the signal sensitivity of the mobile radiophone, the a cell site outputs the mobile attenuation code (MAC) signal of three bits in order to control the signal intensity. Receiving the MAC signal, the mobile radiophone radiates the RF signal for the Power Level of a given class. The Power Class is determined according to the classes of the mobile radiophone as shown in Table 1, for example, the car phone is classified into class I, and a HHP is classified into class III. Thus, the total number of power levels for the car phone is 8, and each level is reduced by 4-dB starting from the highest level (PL0). On the other hand, the total number of power levels for HHP is 6 (since, PL0-PL2 are common), and each level is reduced by 4-dB starting from the highest level (PL0-PL2).

However, since the largest output level of such a HHP is about 0.6-watt and it further decreases upon use in a vehicle, the probability of communication success therein becomes low. Thus, when trying to employ the HHP in a vehicle, an output level thereof has to be amplified over 3-watts, that is, the maximum output level of the car phone. To overcome such a drawback, there is employed a booster capable of amplifying an output of the HHP up to close to that an of the car phone and making the communication by taking an antenna designed for use in the car phone, with gain of which is at least three times as high as that of an HHP-antenna. In such a construction, the HHP is disposed on a driver's seat, and the booster module is disposed in the trunk of a car. In addition, the HHP and the booster module are coupled to each other through a high-frequency cable of preferably 50-ohms, in which the booster module takes its power source from a battery of a car. As shown in the above table 1, while the number of RF-power levels in the HHP is six since three power levels PL0, PL1 and PL2 are the same, the number of RF-power levels of the car phone is eight. Hence, when the HHP of known arts is to be used as the mobile radio telephone for vehicles, an additional control circuit should be adapted, so that the RF control output according to class III of the HHP could be applied to that of class I of the car phone, within the booster module

SUMMARY OF THE INVENTION

Accordingly, the object of the present invention is to provide a circuit capable of controlling RF-power levels without application of an additional controller onto a booster module when trying to utilize a hand-held radio telephone as a mobile radiophone for use in a vehicle.

Another object of the present invention is to provide a circuit capable of selecting a correct level of RF-power output suitably corresponding to a desired mode of the mobile radiophone, due to the generation of a logic control signal having a plurality of bits.

Still another object of the invention is to provide an RF-power level control circuit to enable easy and efficient control of the output level in the mobile radiophone as well as a booster module thereof.

To achieve the above objects and other advantages of the invention, the RF-power level control circuit includes: a comparing amplifier for comparing a radio-frequency power control voltage Vo with a feedback voltage Vf and thereby amplifying the compared voltage; a first power amplifier for amplifying a radio-frequency input signal received from a modulator to a radio-frequency power-level just suitable to the mode for a hand-held mobile radiophone, according to output of the comparing amplifier; a second power amplifier of booster module, coupled to the output of the first power amplifier, for amplifying the output into another radio-frequency power-level suitable to the mode for the vehicle mobile radiophone; first voltage source of logic high level; second voltage source of logic low level; a switching circuit for selectively outputting the first or second voltage source through each bit of output port switched according to the first or second logic control signal; and a device for producing the radio-frequency power control voltage to control the radio-frequency power, by combination of resistors each having a given value according to the first and second voltage sources, each of the output ports of the switching circuit being connected with one of the resistors in series, the resistors connected with another resistor at a common point.

BRIEF DESCRIPTION OF THE ATTACHED DRAWINGS

For a better understanding of the invention and to show how the same may be carried into effect, reference will now be made, by way of example, to the accompanying diagrammatic drawings, in which:

FIG. 1 shows a preferred embodiment of the invention; and

DETAILED DESCRIPTION OF THE PREFERRED EMBODIMENT

Figure 2:
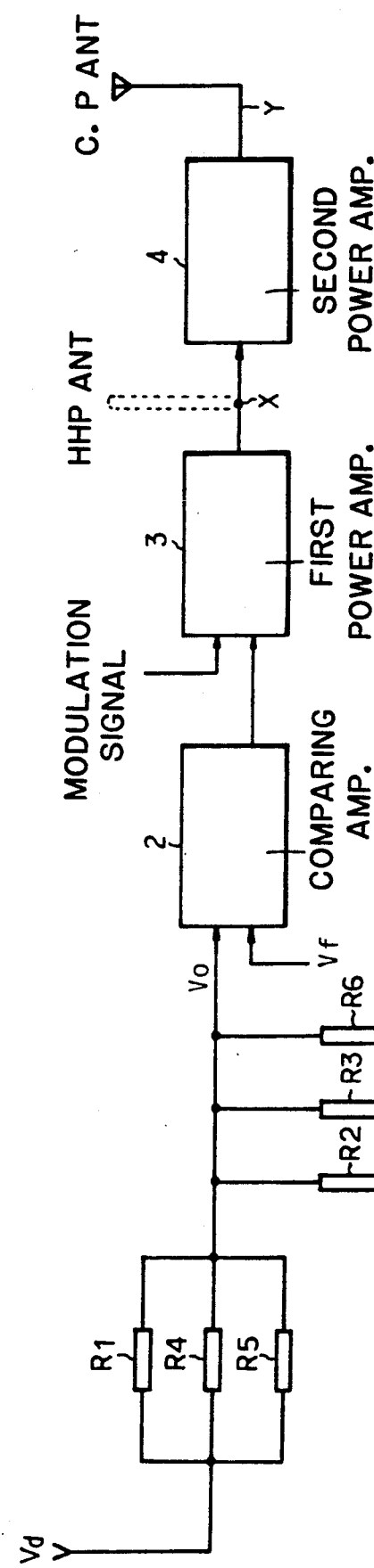
FIG. 2 shows an equivalent circuit of FIG. 1 according to a specific logic control signal.

Referring to FIG. 1, showing a preferred embodiment in which there is taken a 5-bit logic control signal, the inventive circuit includes a switching circuit 1 for selectively outputting a first or second source voltage through each output port (A to E) thereof corresponding to each bit of the logic control signal supplied from a logic controller (not shown). A source voltage supplying terminal Vcc is connected with variable resistor VR1 and resistor R7. The other end of the resistor R7 is grounded. In response to the logic control signal of five bits generated by the logic controller for controlling the entire operation of the mobile radiophone, the switching circuit 1 selectively outputs through each output terminals A,B,C,D and E, a first voltage Vd is provided between the variable resistor VR1 and resistor R7 and a second voltage Vs is of ground potential. Connected to the output terminals A through E of the switching circuit 1 are resistors R1 to R5 respectively whose other ends are connected together and attached to another resistor R6. The combination of resistors R1 to R6 produces an RF power control voltage Vo in response to the first and the second voltages Vd and Vs. Comparing amplifier 2 compares the RF power control voltage Vo with a feedback voltage Vf as well as amplifying the compared voltage. A first power amplifier a 3 amplifies RF input signal received from a modulator (not shown) into an RF power-level suitable to the HHP, according to the output of the comparing amplifier 2. Second power amplifier 4 of booster module is coupled to the output of the first power amplifier 3, which is amplified into another RF power-level suitable to the car phone through the second power amplifier.

According to the invention, it should be noted that the number of input/output ports of the switching circuit 1 and resistors coupled thereto may be expanded as the bit number of the logic control signal increases.

According to the circuit described above, in the HHP mode is generated a first logic control signal so as to produce six voltage levels of RF-power suitable for the class III of table 1, wherein its RF output is amplified to a given level of the HHP mode in the first power amplifier 3 to thereafter go into the air through a HHP-antenna, whereas in the booster mode is generated a second logic control signal so as to produce eight voltage levels of RF-power suitable for class I of table 1, wherein its RF output is amplified to a given level of the car phone mode according to the second power amplifier 4 of the booster module to thereafter go into the air through a car phone antenna.

FIG. 2 shows an equivalent circuit to the inventive circuit of FIG. 1, when the logic control signal is "10011" in binary code.

Now, the operation of the inventive circuit will be described in detail with reference to the aforementioned FIGS. 1 and 2. According to the EIA specification, when using the HHP only in its original HHP mode, the maximum output level of RF-power (PL0, PL1, PL2) in X-node of the HHP antenna port through the first power amplifier 3, would be 0.6-watt, and the remaining output levels (PL3 to PL7) each would decrease by 4-dB, preferably. However, when adapting the booster module to utilize the HHP as a car phone, eight power levels in total should be outputted and controlled therein, since there are the same six power levels as in the X-node and two additional power levels (PL0, PL1) each increased by 4-dB from the maximum X-node output, in the Y-node of the car-phone antenna port through the second power amplifier 4. Thus, to achieve these requirements, each logic level corresponding to each MAC signal is measured one by one, and, in advance, is stored into an internal memory in the logic controller controlling the entire operation of HHP. Thereafter, by receiving a 3-bit MAC signal transmitted from a cell site, it is read a logic level corresponding to said MAC signal. Then, a 5-bit first or second logic control signal according to the MAC signal should be produced in response to selection of the HHP mode or the booster mode. In the above description, the first logic control signal is a logic control signal for generating eight power levels prescribed according to the class I, and the second logic control signal is another logic control signal for generating six power levels prescribed according to the class III. Here, the reason why the 5-bit logic control signal is used, is that at least 31 levels of signals should be produced to select a correct power level exactly suitable for the HHP mode or the booster mode.

If the logic controller generates a 5-bit logic control signal, RF-power control levels of 31 states. Namely, the logic states will be provided reaching from "00001"

to "11111" except "00000" are set. Here, "0" indicates the second voltage Vs of low logic level, and "1" indicates the first voltage Vd of high logic level. The first voltage Vd is obtained by dividing the supplying voltage Vcc generated from a 5 volts regulator (not shown) by variable resistor VR1 and resistor R7, and the second voltage Vs is of ground potential.

Hence, if the logic controller generates an arbitrary logic control signal of 5 bits, the switching circuit 1 is switched according to the logic control signal to selectively output the first voltage Vd or the second voltage Vs through the output terminals A, B, C, D and E. The outputs of the switching circuit are combined through resistors R1–R6 to make an RF-power control voltage Vo inputted into the comparing amplifier 2. For example, if the output of switching circuit 1 is A=1, B=0, C=0, D=1, and E=1, its equivalent circuit is shown in FIG. 2, and Vo is given by the following equation.

$$Vo = \frac{Vd(R2//R3//R6)}{(R1//R4//R5) + (R2//R3//R6)} \quad (1)$$

The supplying voltage Vcc is varied through the variable resistor VR1 to produce the first voltage Vd whereby all the 31 output levels may be precisely adjusted. Hence, once the value of the first voltage Vd is determined, it is set at a center value of variable resistor VR1. In this case, it is desirable for the setting of the voltage Vd to be adjusted very fine (Vd=±0.3V) during adjusting of the variable resistor VR1 from the beginning to the end. The reason to do so, is that because the output voltage VO in low power levels (i.e., PL6, PL7) is finely controlled by the characteristics of the first and second power amplifier 3 and 4 a wide range of values for the first voltage Vd is not necessary, and even if the variable resistor VR1 is displaced due to vibrations and impacts caused by movement of the mobile radiophone, the output voltage should not deviate from the prescribed RF-power level specification. Also, the RF power control levels of 31 states are determined by the values of resistors R1–R6. Properly selecting the values of the resistors, the levels may be sequentially arranged from the level 1 (00001) to the level 31 (11111). For example, if the first voltage Vd is 4.5 V and the second voltage Vs is OV, and there are set R1=10K, R2=20K, R3=39K, R4=80K, R5=160K and R6=56K, each in ohms, then the power levels of the 31 states are as shown in the following Table 2

TABLE 2

| Power Level | A | B | C | D | E | Output Voltage |
|---|---|---|---|---|---|---|
| 1 | 0 | 0 | 0 | 0 | 1 | 0.133 |
| 2 | 0 | 0 | 0 | 1 | 0 | 0.265 |
| 3 | 0 | 0 | 0 | 1 | 1 | 0.398 |
| 4 | 0 | 0 | 1 | 0 | 0 | 0.544 |
| 5 | 0 | 0 | 1 | 0 | 1 | 0.676 |
| 6 | 0 | 0 | 1 | 1 | 0 | 0.809 |
| 7 | 0 | 0 | 1 | 1 | 1 | 0.941 |
| 8 | 0 | 1 | 0 | 0 | 0 | 1.060 |
| 9 | 0 | 1 | 0 | 0 | 1 | 1.193 |
| 10 | 0 | 1 | 0 | 1 | 0 | 1.325 |
| 11 | 0 | 1 | 0 | 1 | 1 | 1.458 |
| 12 | 0 | 1 | 1 | 0 | 0 | 1.604 |
| 13 | 0 | 1 | 1 | 0 | 1 | 1.736 |
| 14 | 0 | 1 | 1 | 1 | 0 | 1.869 |
| 15 | 0 | 1 | 1 | 1 | 1 | 2.001 |
| 16 | 1 | 0 | 0 | 0 | 0 | 2.120 |
| 17 | 1 | 0 | 0 | 0 | 1 | 2.253 |
| 18 | 1 | 0 | 0 | 1 | 0 | 2.385 |
| 19 | 1 | 0 | 0 | 1 | 1 | 2.518 |
| 20 | 1 | 0 | 1 | 0 | 0 | 2.664 |
| 21 | 1 | 0 | 1 | 0 | 1 | 2.796 |

TABLE 2-continued

| Power Level | A | B | C | D | E | Output Voltage |
|---|---|---|---|---|---|---|
| 22 | 1 | 0 | 1 | 1 | 0 | 2.929 |
| 23 | 1 | 0 | 1 | 1 | 1 | 3.061 |
| 24 | 1 | 1 | 0 | 0 | 0 | 3.180 |
| 25 | 1 | 1 | 0 | 0 | 1 | 3.313 |
| 26 | 1 | 1 | 0 | 1 | 0 | 3.445 |
| 27 | 1 | 1 | 0 | 1 | 1 | 3.578 |
| 28 | 1 | 1 | 1 | 0 | 0 | 3.724 |
| 29 | 1 | 1 | 1 | 0 | 1 | 3.856 |
| 30 | 1 | 1 | 1 | 1 | 0 | 3.989 |
| 31 | 1 | 1 | 1 | 1 | 1 | 4.121 |

The thirty-one output voltages (Vo) as shown above are set as reference voltages of the comparing amplifier 2, of which a feedback voltage Vf will become a DC-bias voltage in a first-stage amplifier coupling the first power amplifier with a high-frequency output to thereby convert into DC voltage. Thus, the comparing amplifier 2 compares the feedback voltage Vf with the output voltage Vo to perform a differential amplification, thereby controlling output level of the first power amplifier 3. Hence, the comparing amplifier 2 serves to decide a proper output level according to the RF-power level suitable for the HHP, upon its HHP-mode, outputted from the X-node through the first power amplifier, and also to decide a proper output level according to the RF-power level suitable for the car phone, upon the booster mode, to be outputted from the Y-node through the first power amplifier 3 and the second power amplifier 4 in the booster module. Therefore, when employing the radiophone as for the HHP-purpose only, the six levels corresponding to the Effective Radiated Power (ERP) value of class III prescribed according to the EIA specification of the table 1 are selected out of the 31 output voltages to use them as a reference voltage of the comparing amplifier 2, whereas when employing the radiophone as the car phone along with the booster module, eight levels corresponding to the ERP value of class I are selected having reference from the Y-node, to use as a reference voltage in the comparing amplifier 2. Here, the reference voltages in the HHP mode or booster mode are separate from each other. The logic levels corresponding to the values set as said reference voltages are arranged according to selection of the HHP mode or the booster mode to store them into memory within the logic controller. Thus, when user selects either the HHP mode or the booster mode by manipulating a particular key/keys through a key matrix of the HHP, the logic controller produces a logic control signal corresponding to the output level, namely, the ERP value of the selected mode in response to the MAC signal transmitted from the cell site, with reference to the memory content.

According to the EIA specification, since the tolerance limit of each power level would be preferably between +2 dB and −4 dB, at the a temperature between −10 and 60, the ERP value of each power level may be set to about an intermediate value by combining the first source voltage Vd and the resistors R1 to R6 with each other. Owing to the correct setting of the intermediate value as shown above, the ERP value will be prevented from deviating out of the preferably permitted tolerance limit of the power levels, which may arise due to inherent hardware errors of the components of the inventive circuit. In addition, since it would be possible to perform a fine adjustment of the reference voltage values according to the 31 power levels when varying the first source voltage Vd by adjusting the variable resistor VR1, the adjustment of each power level to an intermediate value or the compensation of output error may be easily and effectively made. Furthermore, since the output level error of the first power amplifier 3 in the HHP is very small, the reference voltages become independent upon the second power amplifier 4 of the booster module, thereby achieving easy designing of the booster module. That is, the output range of the second power amplifier 4 of the booster module would be enough if it is equal to, or exceeds the ERP value range (PL0 to PL7) according to class I. Thus, when operating the HHP according to the present invention, the generation of logic control signals and the output voltage corresponding thereto are as follows:

TABLE 3

| Power Level | MAC 3-bit | Logic Control Signal 5-bit | | Output A B C D E | | Output Voltage Vo | |
|---|---|---|---|---|---|---|---|
| | | HHP | Booster | HHP | Booster | HHP | Booster |
| 0 | 000 | 27 | 29 | 11011 | 11101 | 3.578 | 3.856 |
| 1 | 001 | 27 | 25 | 11011 | 11001 | 3.578 | 3.313 |
| 2 | 010 | 27 | 21 | 11011 | 10101 | 3.578 | 2.796 |
| 3 | 011 | 21 | 17 | 10101 | 10001 | 2.796 | 2.253 |
| 4 | 100 | 15 | 14 | 01111 | 01110 | 2.001 | 1.869 |
| 5 | 001 | 11 | 10 | 01011 | 01010 | 1.458 | 1.325 |
| 6 | 101 | 7 | 7 | 00111 | 00111 | 0.941 | 0.941 |
| 7 | 111 | 5 | 4 | 00101 | 00100 | 0.676 | 0.544 |

As described above, when utilizing the HHP as the car phone, since the inventive system does not require an additional circuit to control output of the booster module, the system construction may be easy and its production cost may be saved. In addition, since the system provides reference voltages corresponding to each mode selected, by only selecting either one of the six output voltages suitable for the HHP mode or the eight output voltages suitable for the booster mode, among the plurality of output voltages. Since it is possible to make a precise setting of the ERP values according to each power level by employing a free combination of the first source voltage and a plurality of resistors, it may prevent from deviation of the tolerance limit hardware errors inherent in the component manufacturing, thereby increasing efficiency and reliability of the system. Moreover, since it employs a single variable resistor to change the first source voltage, easy adjustment of output level and time-saving may be obtained. Furthermore, since it will be possible just by adding input/output ports and resistors as needed, to extend a number of the output levels, an easy and economic extension of the system may be achieved.

While the invention has been particularly shown and described with reference to a preferred embodiment, it will be understood by those skilled in the art that modifications in detail may be made without departing from the spirit and scope of the invention.

What is claimed is:

1. A radio-frequency power control circuit for a mobile radiophone, comprising:
   logic controller means for storing logic levels of preset reference voltages corresponding to modes of both a hand-held and vehicle mobile radiophone and generating first and second logic control signals according to a third control signal supplied from a cell site and selection of said mode;
   a first voltage source providing a logic high level;
   a second voltage source providing a logic low level;
   a switching circuit for selectively choosing between said first and second voltage sources to generate a fourth signal according to said first and second logic control signals;
   means for producing a first voltage, from said fourth signal generated by said switching circuit, to control said radio-frequency power, comprising:
     a plurality of first resistors each having a first terminal connected to a respective output port of said switching circuit; and
     a second resistor connected at a common node to a second terminal of each of said first resistors;
   comparing means, coupled to receive said first voltage and a feedback voltage, for making a comparison between said first voltage and feedback voltage, generating a resultant voltage and amplifying the resultant voltage to produce a compared voltage;
   first amplifier means, coupled to receive said compared voltage and to receive a fifth signal, from a modulator, for producing from said fifth signal an amplified radio-frequency input signal having a first radio-frequency power-level suitable for a hand-held mobile radiophone, according to said compared voltage produced by said comparing means; and
   second amplifier means, coupled to receive said amplified radio-frequency input signal from said first amplifier means, for amplifying said amplified radio-frequency input signal into a second radio-frequency power-level suitable to the mode for a vehicle mobile radiophone.

2. A circuit as claimed in claim 1, wherein said first and second logic control signals contain at least five bits.

3. A circuit as claimed in claim 2, wherein said first voltage source comprises:
   a third variable resistor;
   a fourth fixed-value resistor; and
   a fourth supply voltage divided by said third and fourth resistors to produce a fourth voltage of logic high level.

4. A circuit as claimed in claim 3, wherein said second voltage source is of ground potential.

5. A circuit as claimed in claim 4, wherein said logic controller stores said logic levels, corresponding to 3-bit mobile attenuation codes transmitted from a cell site, in an internal memory.

6. A circuit as claimed in claim 5, wherein said logic controller produces first logic control signals for generating eight power levels in a first mode, for use as a vehicle radiophone, and second logic control signals for generating six power levels in a second mode, for use as a mobile hand-held phone.

7. A circuit as claimed in claim 6, wherein said second radio-frequency power control voltages are reference voltages based on said logic control signals.

8. A method for controlling the radio-frequency power level of a mobile radio telephone, comprising the steps of:
 generating first high logic level and second low logic level signals;
 receiving a third signal;
 choosing, by a user, between a hand-held phone mode and a vehicle radiophone mode of operation;
 generating, from storage, a first control signal based on both said received third signal and the mode of operation chosen;
 generating third logic level signals based on said first and second signals and said first control signal;
 modifying said first control signal to produce a first output voltage;
 comparing said first output voltage to a feedback voltage to produce a fourth signal;
 amplifying a modulated signal based on said fourth signal to produce a fifth signal for transmission in said portable hand-held phone mode; and
 amplifying said fifth signal to produce a sixth signal for transmission in said vehicle radiophone mode.

9. A method as claimed in claim 8, wherein generating said first control signal produces a logic signal having at least 5-bits.

10. A method as claimed in claim 9, further comprising the step of manipulating particular keys through a key matrix to choose said booster or hand-held phone mode.

11. A method as claimed in claim 10, wherein choosing said booster mode produces third logic control signals capable of generating eight power levels.

12. A method as claimed in claim 10, wherein choosing said hand-held phone mode produces third control signals capable of generating six power levels.

13. A method as claimed in claim 10, further comprising the step of choosing between a first source voltage representing a high level and a second source voltage representing a low level based on received mobile attenuation code signals to produce said third logic control signal.

14. A method as claimed in claim 13, further comprising the step of dividing a source supplying voltage by a variable resistor and a fixed-value resistor to produce said first high logic level signal.

15. A radio-frequency power control circuit, comprising:
 a first voltage source;
 a second voltage source;
 a switching circuit for selectively choosing between said first and second voltage sources according to signals received from a logic controller, to produce a logic control signal;
 means for producing a radio-frequency power control voltage by passing said logic control signal, produced in said switching means, through resistors;
 comparing means for making a comparison of said radio-frequency power control voltage with a feedback voltage;
 first amplifier means for producing an amplified modulation signal of a first level suitable for a hand-held mobile radiophone, from a received modulation signal, based on the result of the comparison by said comparing means; and
 second amplifier means coupled to receive said amplified modulation signal from said first power amplifier, suitable for a vehicle mobile radiophone.

16. A circuit as claimed in claim 15, wherein said logic control signal contains a minimum of five bits.

17. A circuit as claimed in claim 16, wherein said first voltage source comprises:
 a first variable resistor;
 a second fixed-value resistor; and
 a supply voltage divided by said first and second resistors to produce a source voltage of logic high level.

18. A circuit as claimed in claim 17, wherein said second voltage source is of ground potential.

19. A circuit as claimed in claim 18, wherein said logic control signal produced in said switching circuit generates eight power levels in a first mode, for use as a vehicle radiophone, and six power levels in a second mode, for use as a mobile hand-held phone.

20. A circuit as claimed in claim 19, wherein said means for producing comprises a plurality of third resistors, each connected at a first terminal to a respective output port of said switching circuit and having a second terminal connected at a common node with a first terminal of a fourth resistor, said fourth resistor having a second terminal connected to a ground potential.

21. A circuit as claimed in claim 20, wherein said second amplifier means amplifies the amplified modulation signal produced by said first amplifier means into a second level suitable for a mobile radiophone.

* * * * *

UNITED STATES PATENT AND TRADEMARK OFFICE
CERTIFICATE OF CORRECTION

PATENT NO. : 5,101,507

DATED : March 31, 1992

INVENTOR(S) : Jae-Ik JUNG

It is certified that error appears in the above-identified patent and that said Letters Patent is hereby corrected as shown below:

IN THE ABSTRACT
(Title Page)

Line 3, replace "utilizing an" with --utilizing a--.

Column 1, Line 10, replace "Powder" with --Power--.

Column 2, Line 17, delete "the";

Line 39, insert --an output-- before "close", and delete "an";

Line 58, insert a period after "module";

Column 4, Line 3, delete "a"; insert "a" after "amplifies'

UNITED STATES PATENT AND TRADEMARK OFFICE
CERTIFICATE OF CORRECTION

PATENT NO. : 5,101,507

DATED : March 31, 1992

INVENTOR(S) : Jae-Ik Jung

It is certified that error appears in the above-identified patent and that said Letters Patent is hereby corrected as shown below:

Column 5, line 34, insert a comma after "4".

Signed and Sealed this

Sixth Day of July, 1993

Attest:

MICHAEL K. KIRK

*Attesting Officer*     Acting Commissioner of Patents and Trademarks